(12) United States Patent
Lee

(10) Patent No.: US 7,849,750 B2
(45) Date of Patent: Dec. 14, 2010

(54) SENSING APPARATUS OF BOURDON PRESSURE GAUGE

(75) Inventor: Deok-Jae Lee, Uijeongbu-si (KR)

(73) Assignee: Metachem Inc., Anseong-Si, Gyeonggi-Do (KR)

( * ) Notice: Subject to any disclaimer, the term of this patent is extended or adjusted under 35 U.S.C. 154(b) by 207 days.

(21) Appl. No.: 12/301,016

(22) PCT Filed: May 15, 2007

(86) PCT No.: PCT/KR2007/002387

§ 371 (c)(1),
(2), (4) Date: Nov. 14, 2008

(87) PCT Pub. No.: WO2007/133043

PCT Pub. Date: Nov. 22, 2007

(65) Prior Publication Data

US 2009/0183574 A1     Jul. 23, 2009

(30) Foreign Application Priority Data

May 15, 2006   (KR) .................. 10-2006-0043489

(51) Int. Cl.
    G01L 7/04    (2006.01)
(52) U.S. Cl. ........................................................ 73/732
(58) Field of Classification Search ........................ None
    See application file for complete search history.

(56) References Cited

U.S. PATENT DOCUMENTS

| | | | | |
|---|---|---|---|---|
| 4,738,141 A | * | 4/1988 | Kas .............................. | 73/735 |
| 5,231,508 A | * | 7/1993 | Murphy, Jr. ................ | 338/32 H |
| 6,647,771 B2 | * | 11/2003 | Burns .......................... | 73/146 |
| 6,761,072 B1 | * | 7/2004 | Burns .......................... | 73/708 |
| 6,854,335 B1 | * | 2/2005 | Burns .......................... | 73/728 |
| 7,071,686 B1 | * | 7/2006 | Burns .......................... | 324/244 |
| 2002/0101339 A1 | * | 8/2002 | Burns .......................... | 340/442 |
| 2004/0093652 P1 | | 5/2004 | Hammond | |

FOREIGN PATENT DOCUMENTS

| | | |
|---|---|---|
| DE | 3522383 A | 1/1987 |
| JP | 58223030 A | 12/1983 |
| KR | 10-2006-0037063 A | 5/2006 |

* cited by examiner

Primary Examiner—Andre J Allen
(74) Attorney, Agent, or Firm—Birch, Stewart, Kolasch & Birch, LLP

(57) ABSTRACT

A sensing apparatus of a Broudon pressure gauge is disclosed, which comprises a magnet which has a N pole and a S pole at one end between both ends of the shaft which its connected with the displacement gear and rotates; a sensing unit which is provided in the body at a portion corresponding to the magnet and is disposed on at least three portions in circular directions and includes an AMR sensor or hall sensor for sensing the rotation value of the magnet; and a display control unit which receives a sine signal value and a cosine signal value among phase signal values from the sensors of the sensing unit and corrects the phase values and outputs to the LCD.

21 Claims, 15 Drawing Sheets

[Fig.1]
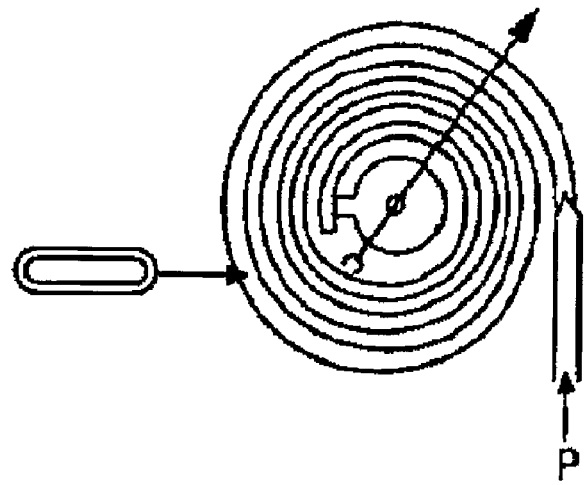
[Fig.2]
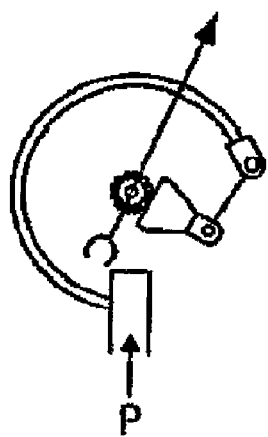
[Fig.3]
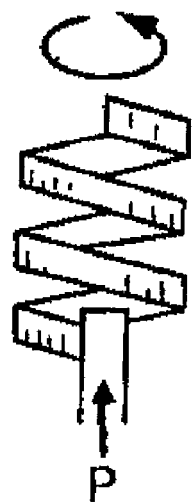

[Fig.4]
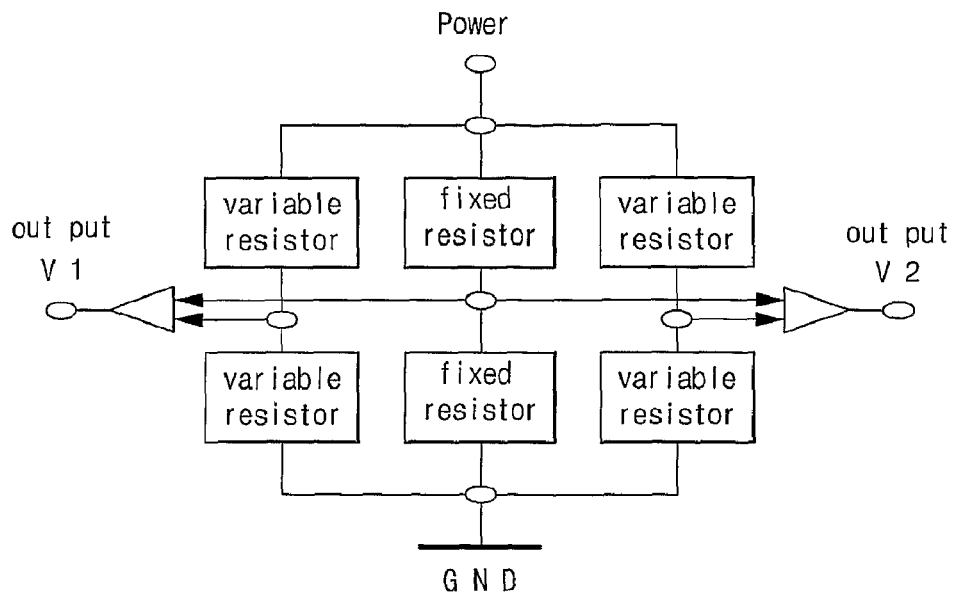
[Fig.5]
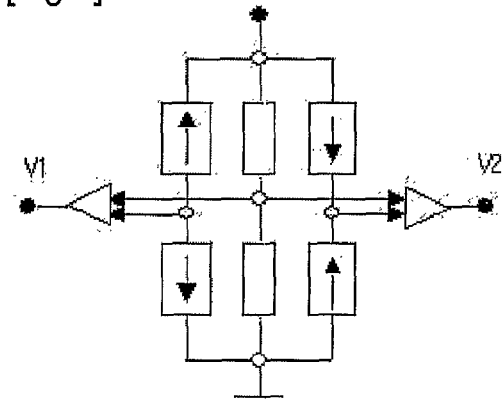
[Fig.6]
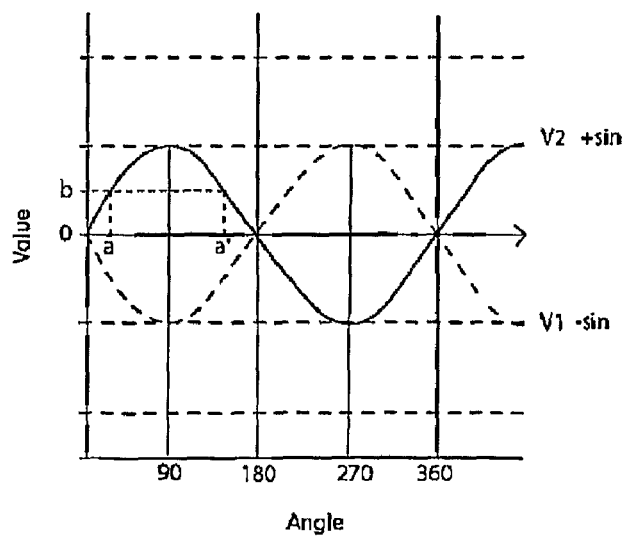

[Fig.7]
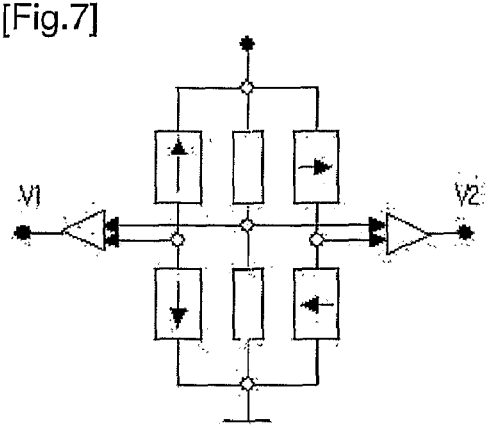
[Fig.8]
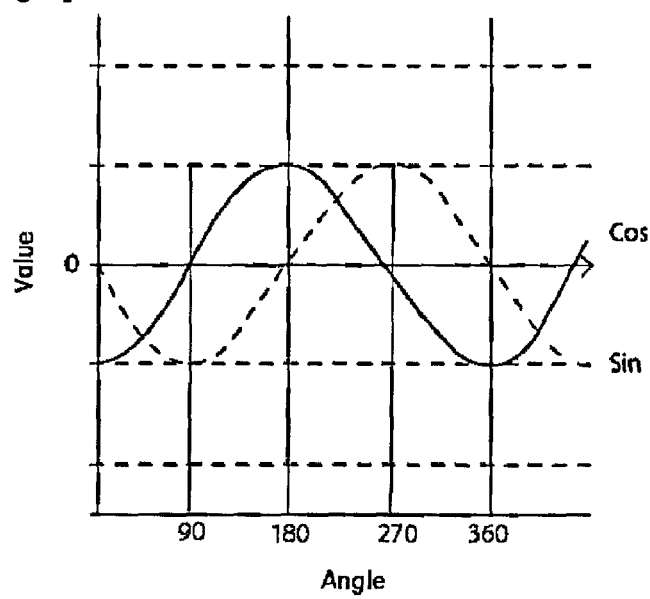
[Fig.9]
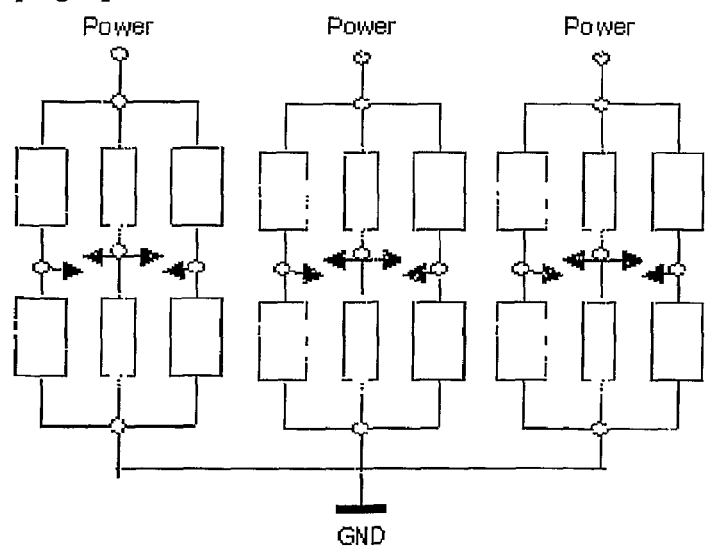

[Fig.10]
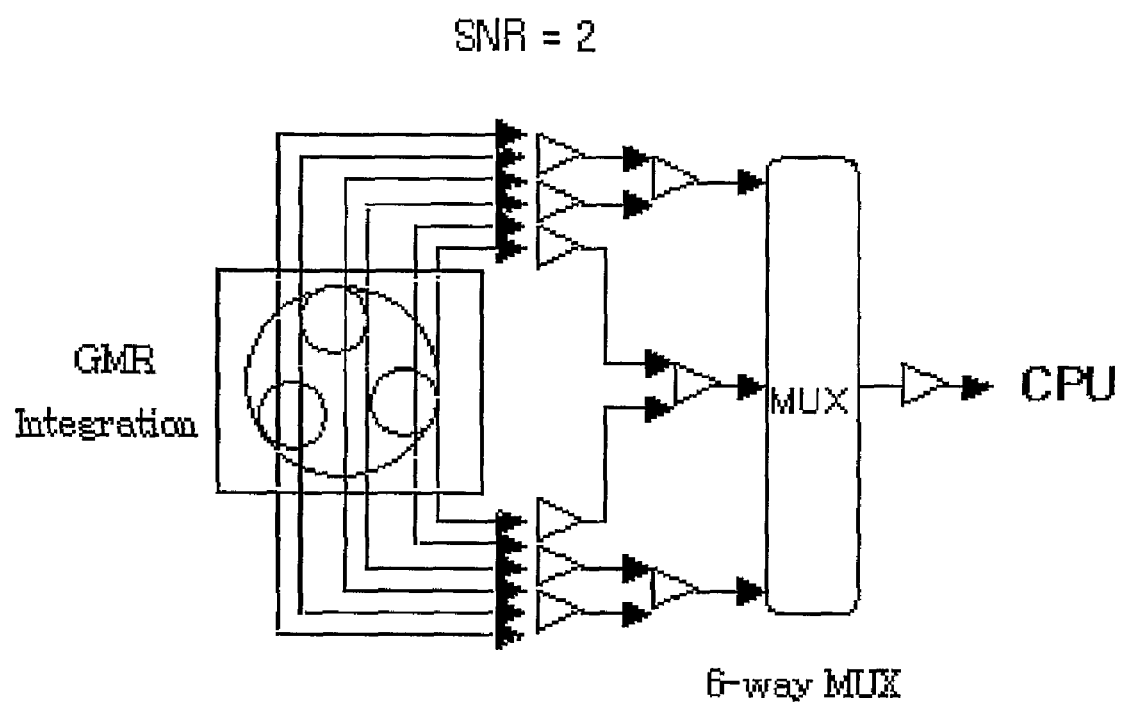
[Fig.11]
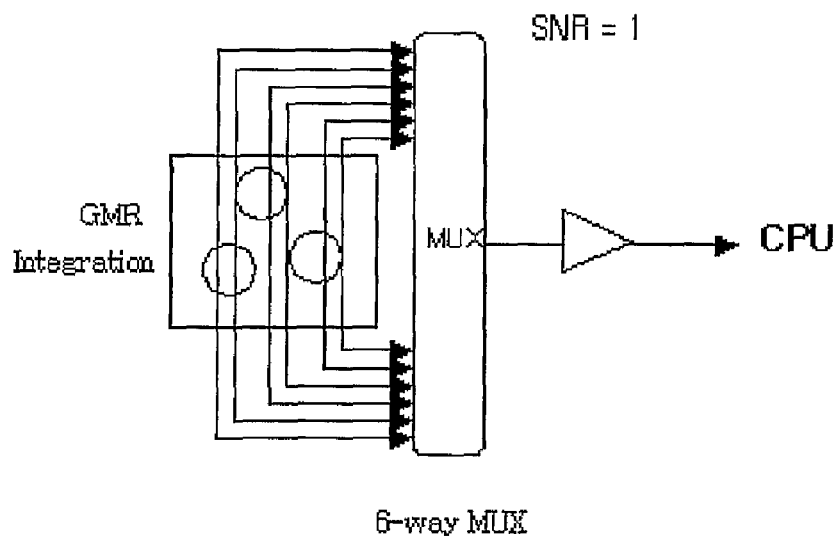

[Fig.12]
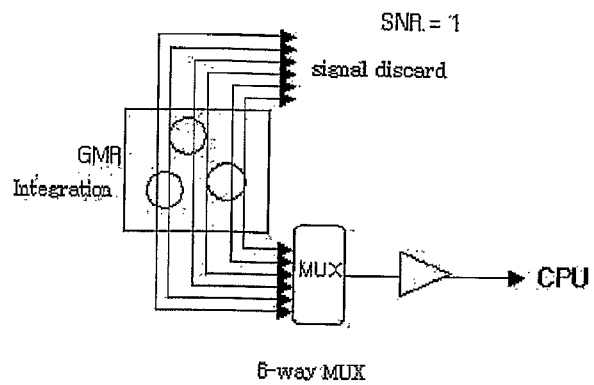
[Fig.13]
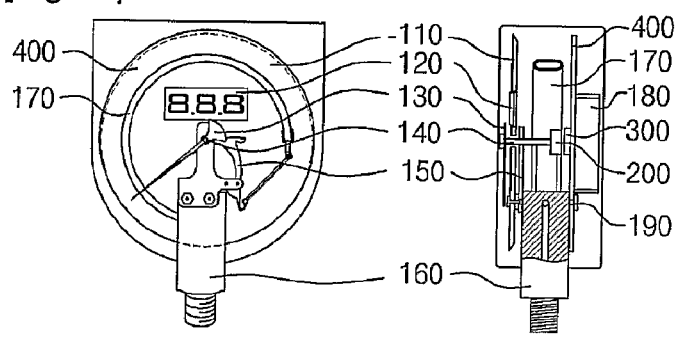
[Fig.14]
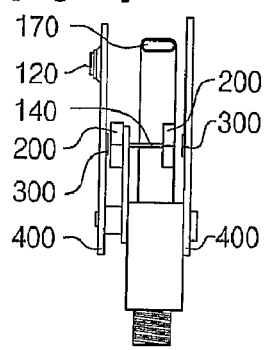
[Fig.15]
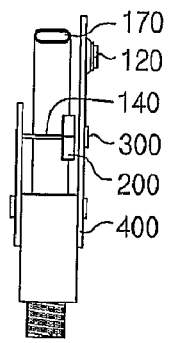

[Fig.16]
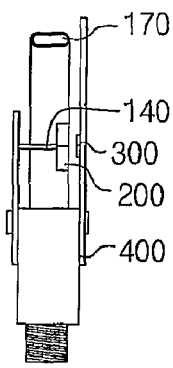
[Fig.17]
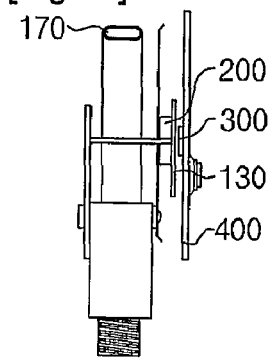
[Fig.18]
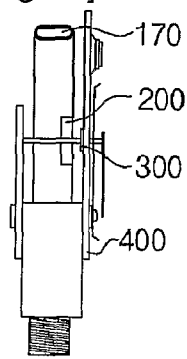
[Fig.19]
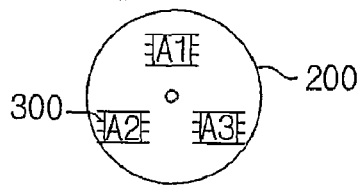
[Fig.20]
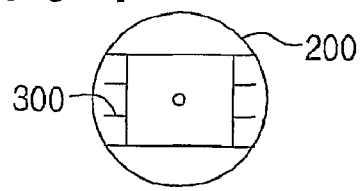

[Fig.21]
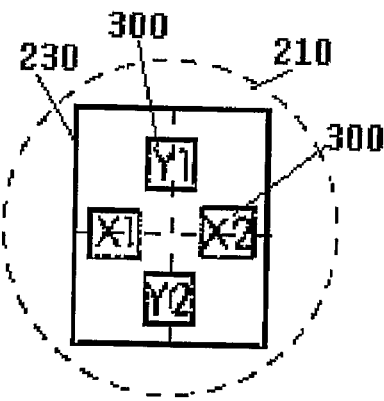
[Fig.22]
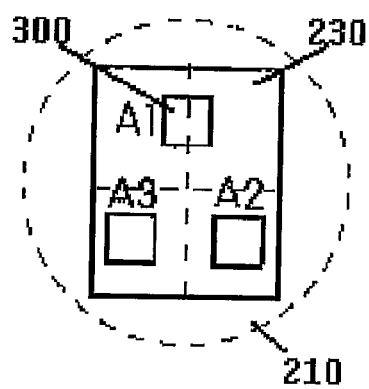
[Fig.23]
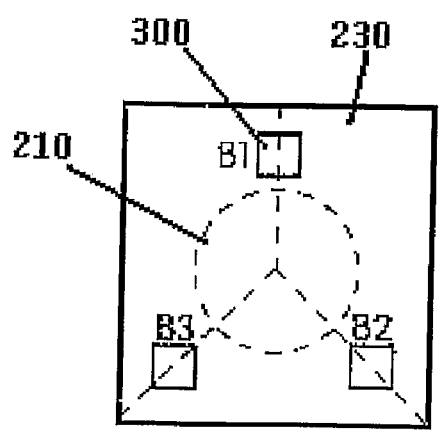

[Fig.24]
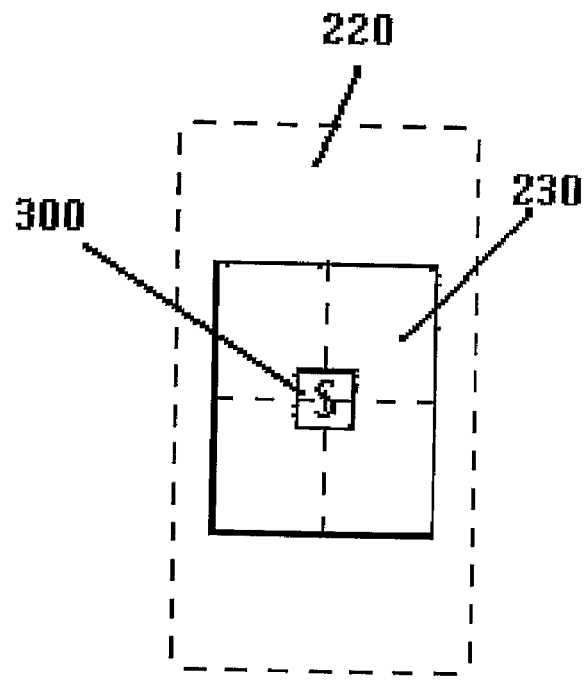
[Fig.25]
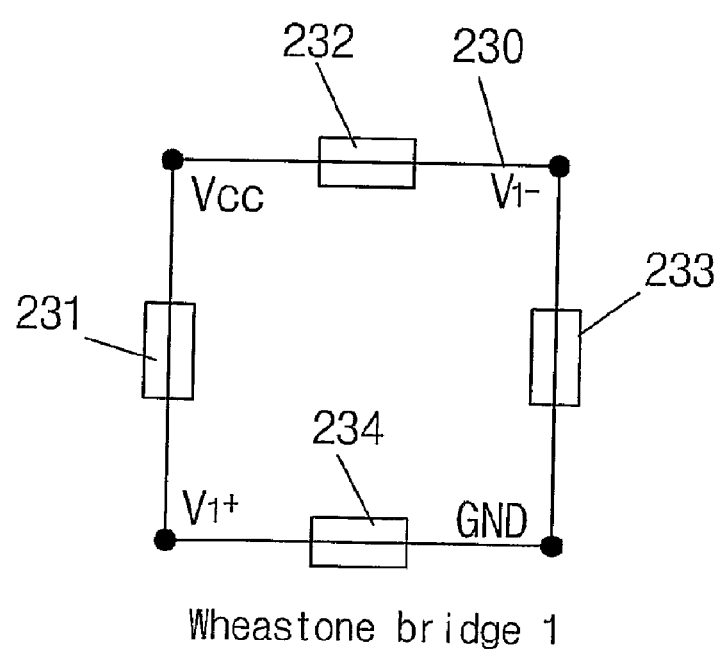
Wheastone bridge 1

[Fig.26]
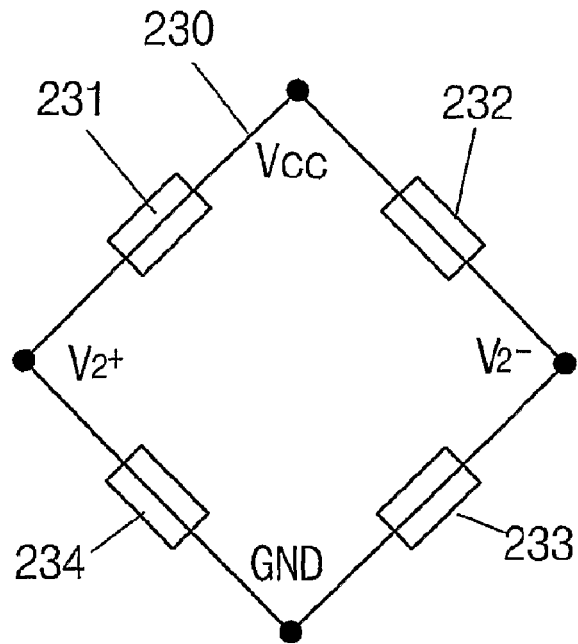
Wheastone bridge 2(45°)
[Fig.27]
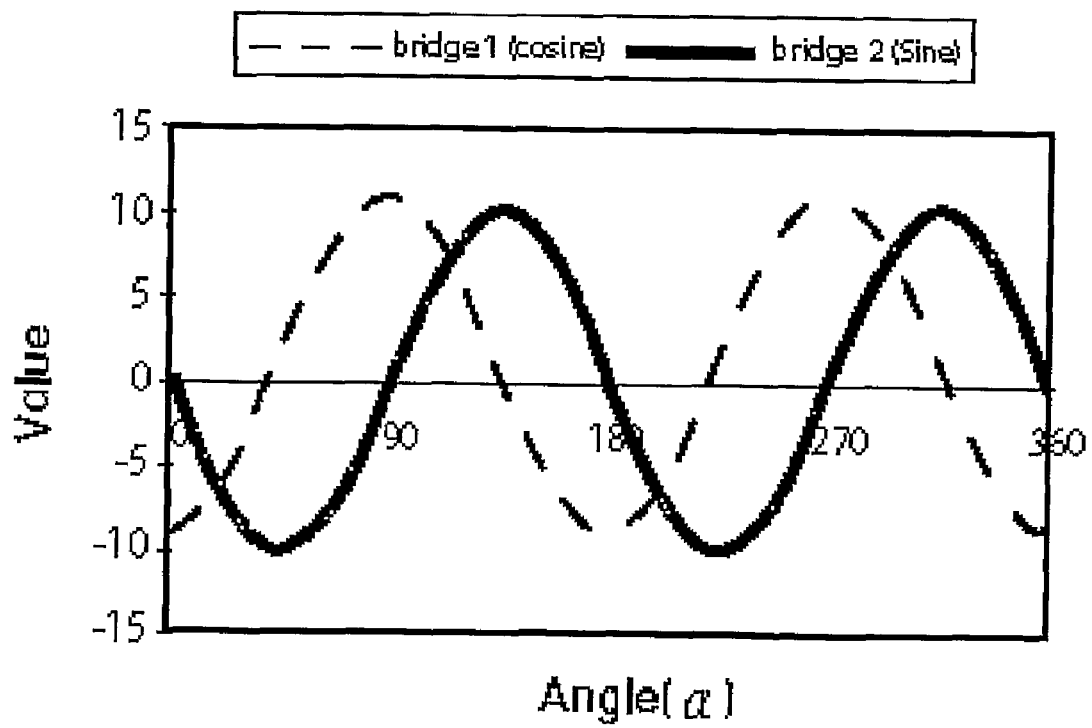

[Fig.28]
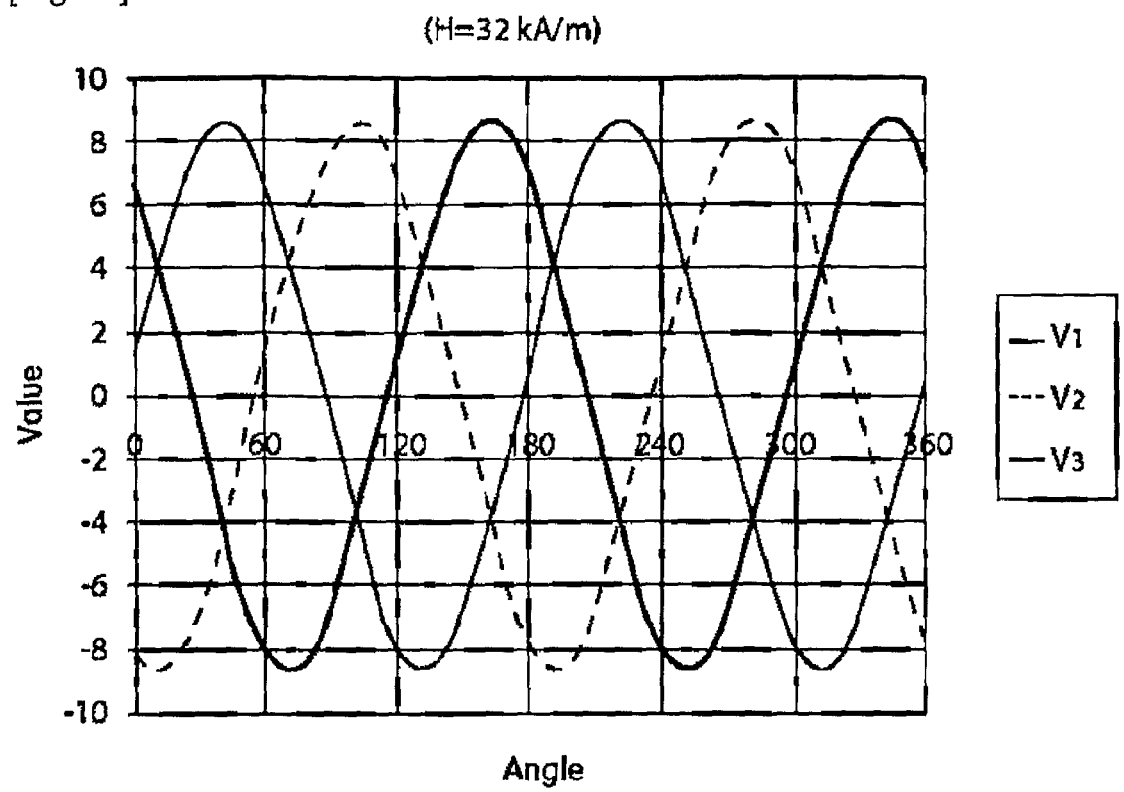
[Fig.29]
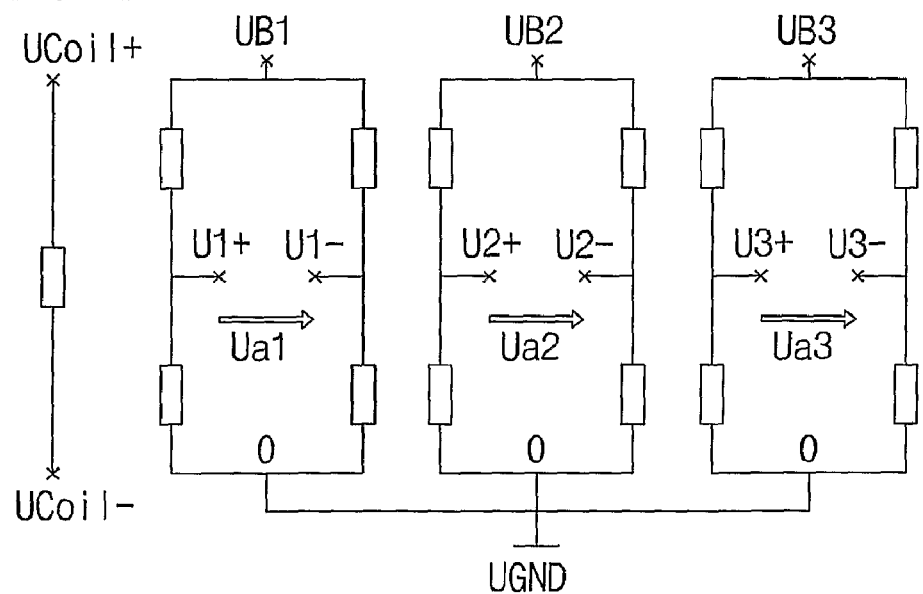

[Fig.30]
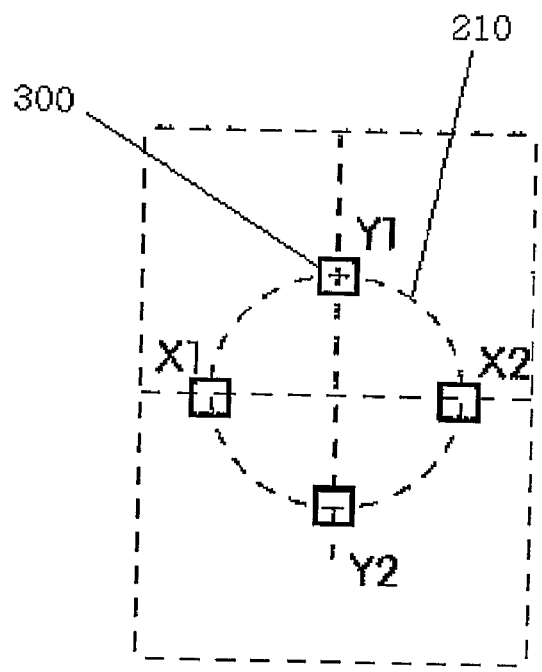
[Fig.31]
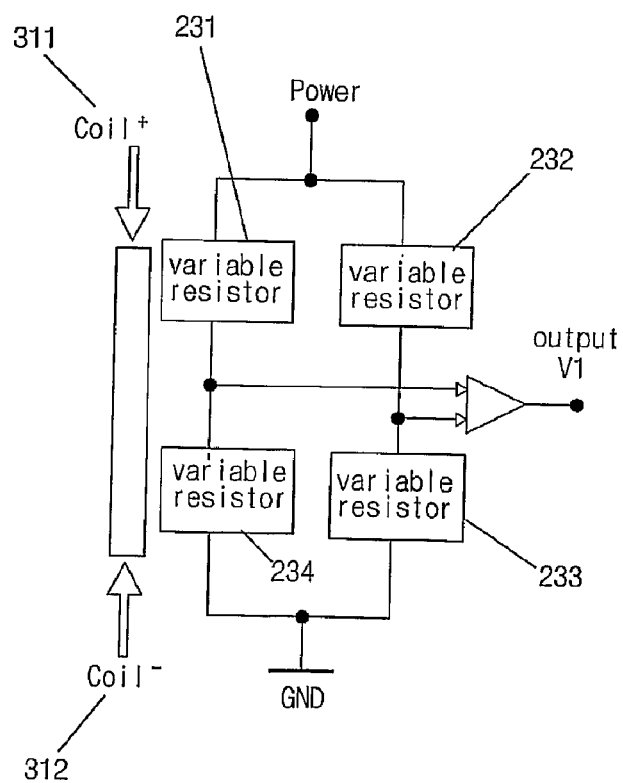

[Fig.32]
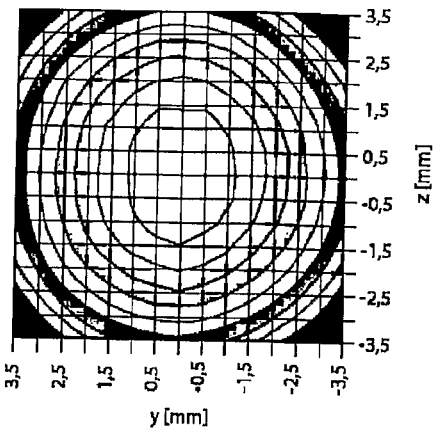
[Fig.33]
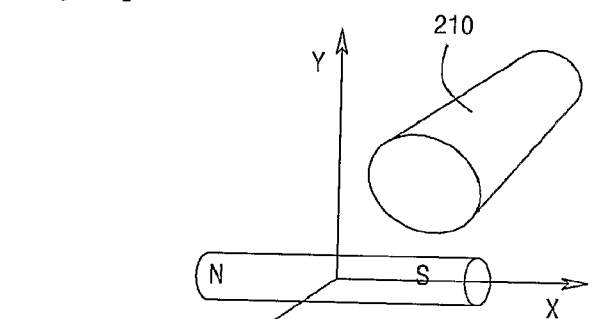
[Fig.34]
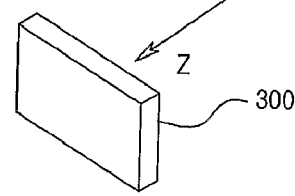
[Fig.35]
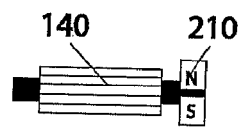
[Fig.36]
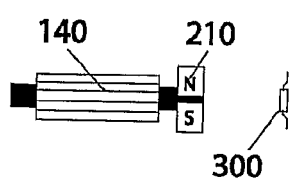

[Fig.37]
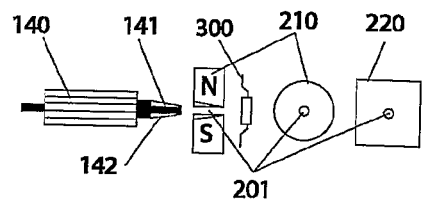
[Fig.38]
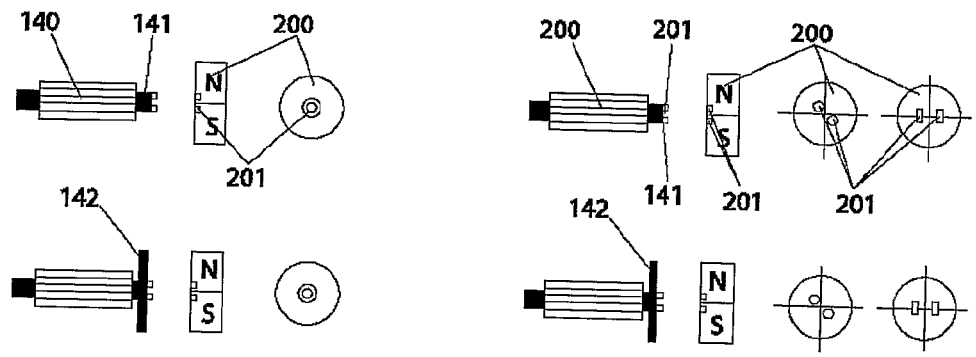
[Fig.39]
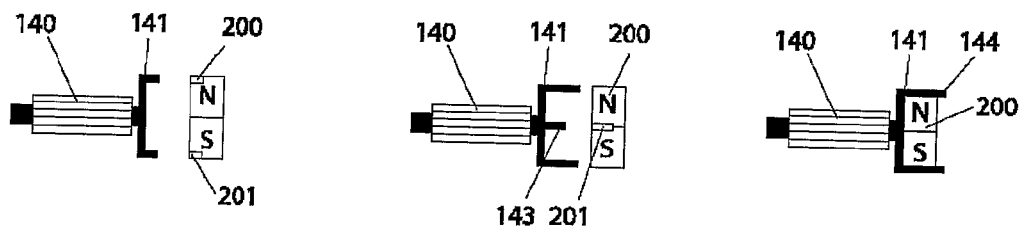
[Fig.40]
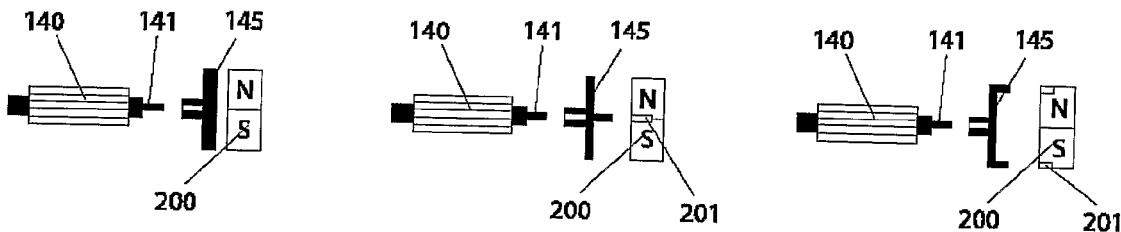

[Fig.41]
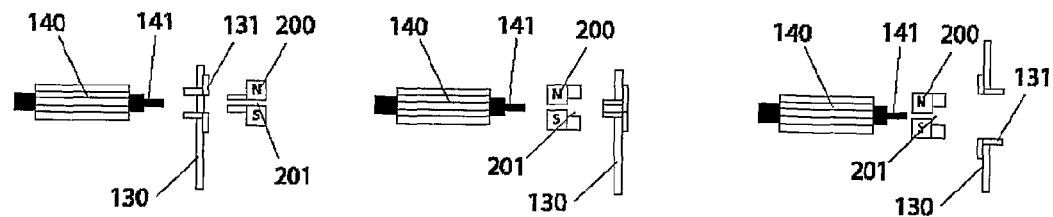
[Fig.42]
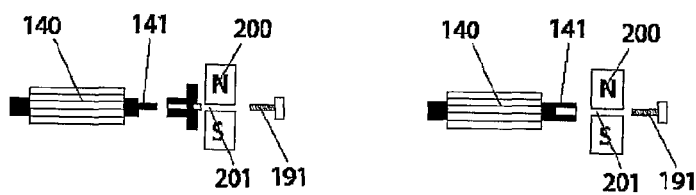
[Fig.43]
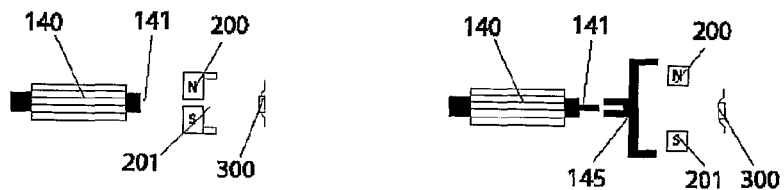

[Fig.44]
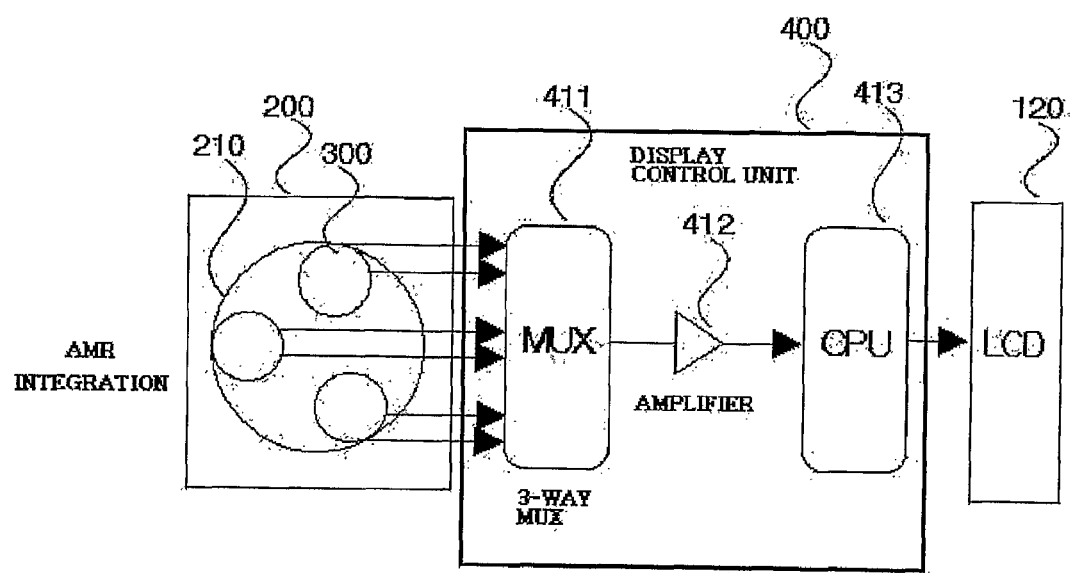

SENSING APPARATUS OF BOURDON PRESSURE GAUGE

TECHNICAL FIELD

The present invention relates to a sensing apparatus of a pressure gauge, and in particular to a sensing apparatus of a Bourdon pressure gauge which is able to implement a high accuracy and low price Bourdon pressure gauge using an AMR (Anisotropic resistor) sensor and a hall IC or a hall sensor.

BACKGROUND ART

Generally, a Bourdon tube is made of a flexible metallic plate by sealing a hollow flat tube in a circular shape. As one end of the tube is applied with a pressure, the other end, which is not fixed, moves in a direction that a curvature radius increases, and the movement degree increases or decreases depending on a size of pressure applied, a size, thickness, material and curvature radius of the tube. The apparatus for measuring pressure of fluid using the above Bourdon tube is called a Bourdon tube pressure gauge.

FIGS. 1 through 3 are cross sectional views illustrating a construction of a conventional Bourdon tube.

The Bourdon tube used for the pressure gauge is classified into a spiral type of FIG. 1, a C-type of FIG. 2, and a helical type of FIG. 3. According to the spiral type, a very thin and flat tube is curved in a spiral shape, so that a long and physically sensitive Bourdon tube is made for thereby increasing a movement distance of a free end. An indicator may be directly attached to a free end without using other application apparatuses. According to the C-type and helical type, as the movement distance of the free end is relatively short, it is needed to move the indicator based on amplification using a lever principle or a hand fan shaped pinion gear.

Here, the Bourdon tube pressure gauge comprises a Bourdon tube which is formed in a spiral shape and expands based on a pressure, and a needle shaft gear which rotates by means of a displacement gear and has a needle at its front end for indicating scales.

The Bourdon tube pressure gauge is designed to visually indicate the pressure based on the displacement of the Bourdon tube which expands and contracts in accordance with the pressure. Namely, as the needle shaft gear with a fixed needle via the displacement gear rotates based on the displacement of the Bourdon tube, the needle rotates for thereby visually indicating the pressure scales.

Since the Bourdon pressure gauge indicates a pressure scale using a needle based on an analog method, it is needed to make the outer diameter of the scale plate larger so that a small scale is visually seen. In particular, since it is impossible to obtain a digital value, an expensive digital pressure gauge is needed. A user, who uses a digital pressure gauge and is used to a conventional Bourdon tube pressure gauge, is impossible to well recognize a certain output value in a permitted pressure with respect to the output value. The above problem occurs since the conventional users are used to an analog Bourdon pressure gauge for long time periods.

So as to overcome the above problem, an electronic type pressure gauge using a conventional Bourdon gauge is disclosed in the US patent 2004/0093952 (electronic pressure converter, referred to conventional art 1), and there is a Korean patent application number 10-2004-0086196 (electronic type Bourdon tube pressure gauge, referred to conventional art 2).

According to the electronic pressure converter of the conventional art 1, a bar type magnet having N and S poles is prepared, and a sensor is disposed at an intermediate portion of the bar magnet. The GMR (Giant Magneto Resistance) sensor senses the rotation of the bar magnet. The sensor comprises two fixed resistors, and four variable resistors, so that two output values V1 and output values V2 (Sin, Cos) are outputted from one sensor.

FIG. 4 is a block diagram illustrating a construction of a GMR sensor in a conventional electronic type pressure gauge.

As shown in FIG. 4, the fixed resistor is adapted to compute an offset value. A pair of upper and lower resistors detect the sensing direction of the variable resistor in a horizontal direction, and a pair of the other upper and lower resistors are positioned at angles of 45° and 90° and sense the magnetic force of the magnet. A pair of the upper and lower resistors of the left side generate the sine value V1, and the upper and lower resistors of the right side generate the Cos value V2.

The fixed resistors provided at the center of FIG. 4 are arranged to set the offset values of the output value V1 and the output value V2. The output value V1 is obtained from the fixed resistor disposed at the center and the variable resistor disposed at the left side, and the output value is obtained from the fixed resistor disposed at the center and the variable resistor arranged at the right side. When there is not provided magnetic force, since the fixed resistor value and the variable resistor value are same values, the output value Vn is 0. The fixed resistor outputs values which does not change with respect to the direction of the magnetic force, and the variable resistor outputs variable values depending on the magnetic force. The above GMR sensor may have a plurality of sensors for detecting over 360°.

In addition, so as to obtain the offset value V1, it is needed to first compute the minimum value of V1 from the maximum value of V1 and is divided by 2.

(V1 offset=(Ve max−V1−min)/2) is performed.

So as to obtain the offset value V2, the min value V2 is obtained from the max value V2 and is divided by 2.

(V2 offset=(V2 max−V1 min)/2) is performed.

In addition, the gain value V2 is obtained by subtracting the min value V1 from the max value V1, and the obtained value is divided by the value obtained by subtracting the min value V2 from the max value V2.

V2 Gain=(V1 max−V1 min)/(V2 max−V1 min) is performed.

The actual rotation angle is obtained using the values V1 and V2.

Arctan((V1−V1 offset)/(V2−V2 offset)*V2 Gain) is performed.

The problems of the conventional art are as follows.

The GMR sensor is similar with the AMR sensor since it is used for a high resolution and reaction speed (Bandwidth), and the magnetic force is used in a range of mT (mill-tesla), but since the sensitivity and Hysteresis are so high. So, it is generally used for measuring the displacement, 1. Signal to Noise Ratio: SNR As shown in FIG. 4, since the output values V1 and V2 are obtained based on the variable resistors, assuming that the SNR is 1, when one output value is intended to obtain from the Wheatstone bridge, the SNR is 2. According to the sensor structure of the conventional art 1, the SNR has only 50% performance as compared to the structure of the Wheatstone bridge.

2. Offset Value

The max and min values should be measured so as to obtain the output offset value. Since the GMR sensor does not recognize the poles N and S of the magnet, it is possible to obtain the max and min values based on the rotation of 180°+1°. Namely, it is needed to obtain the max and min values by rotating over 180° before every measurement, and the rotation degree of the Bourdon pressure gauge is converted into digital values for thereby obtaining the pressure values.

In this case, when it rotates over 180°, the errors occurring in the current magnetic force and the external temperature are corrected, and the pressure rotation value of the Bourdon tube pressure gauge is converted into digital signals for thereby decreasing the errors. According to another method, the product is assembled and rotated over 180°, and the max and min values are stored in an electronic unit and is used.

In the former case, works are complicated, and in the later case, the magnetic force of the permanent magnet is weakened as the time passes, so that it is impossible to correct changing output values and to correct when the output values change owing to the external temperature for each measurement Namely, the errors of the measurement values occur owing to the elapse of the time or the change of the external temperature, not by the number of uses.

The magnetization coil is attached to the sensor, and offset value is set by obtaining the max value from the coil "+" and the min value from the coil "−". In this case, when the magnetic force weakens depending on the elapse of time, and in the case when the external temperature changes, it is possible to obtain corrected values. In case that there is provided a certain apparatus which is able to generate and maintain a constant temperature in the electronic unit, it is possible to more accurately correct the errors with respect to the changes of temperature. In this case, the manufacture cost and power consumption increase, but it is possible to obtain a desired performance in the course of development of high accuracy standard pressure gauges. However, the conventional arts do not disclose any technology for implementing the above magnetizing coil.

3. Output Value

FIG. 5 is a block diagram illustrating a sensing direction of the variable resistor of FIG. 4, and FIG. 6 is a graph of an output value based on the rotation angle of FIG. 5.

As shown in FIG. 5, when the resistance unit is formed using one sensor, sine and −sine values are outputted. In this case, unnecessary −sine value is outputted. As shown in FIG. 5, when the rotation angle is obtained using one sensor, the use angle is limited, and it is impossible to recognize 360°.

FIG. 7 is a block diagram of a sensing direction of the variable resistor when the resistance unit is formed using one sensor of FIG. 4, and FIG. 8 is a graph of an output value based on the rotation angle of FIG. 7.

When the resistance unit is formed using one sensor as shown in FIG. 7, it is possible to obtain sine and cosine output values. In this case, it is impossible to obtain an accurate position with only one sensor.

As shown in FIGS. 6 and 8, the rotation angles b and b' are obtained. In more detail, since it is not sure to judge whether the output value a is an output value at the rotation angle b or not, or it is an output value at the rotation angle b', it is impossible to compute the rotation degree with one sensor. In particular, it is impossible to recognize the rotation angle 360°.

One measurement range is about 120°, and the valid angle is about 90°. In more detail, when the distance of the variable resistor is distanced by a few of mm, and the sensor is manufactured, and one sensor is installed at the Bourdon tube pressure gauge, the measurement is performed in about 9 hour direction and 3 hour direction, so that the measuring angle is limited.

4. Rotation Degree Measurement

It is very limited to compute the rotation angle with arc tangent using the output value from the resistance unit provided in the GMR sensor. As shown in FIG. 7, it is possible to sine and cosine values using one GMR sensor, but when it is needed to recognize the rotation angle 360°, the arc tangent is useless. As shown in FIG. 7, since it is limited when obtaining the output value of FIG. 7, the arc tangent value obtained based on the same is limited as well.

5. Multiple Sensors

For easier description, it is assumed that three sensors are used. In case that the GMR sensor is used, at least three sensors are needed for measuring at 360°.

FIG. 9 is a block diagram illustrating an example that two output values from three sensors are amplified twice and used in a conventional art. FIG. 10 is a block diagram illustrating an example that two output values from three sensors are amplified using a 6-way multiplexor in a conventional art. FIG. 11 is a block diagram illustrating an example that one output value from three sensors is amplified using a multiplexer in a conventional art. FIG. 12 is a block diagram illustrating an example that one output value from three sensors is amplified using a multiplexer in a conventional art.

Namely, FIG. 9 shows a layout of the sensors, and FIG. 10 through 12 are block diagram of the sensors for measuring at 360°. The conventional art 1 does not disclose the detailed method like in FIGS. 10 through 12 except that a plurality of sensors can be adapted.

5-1) In the conventional art 1, since and cosine values can be obtained for measuring at 360°. One sensor is capable of sensing at 120° for thereby sensing at 360°. The conventional art 1 does not disclose a detailed method on the sensor arrangement and a method for computing the rotation angle.

5-2) The SNR of the conventional art 1 is lower 50% as compared to the Wheatstone bridge. So as to increase the SNR, it is needed to use multiple AMPs as shown in FIG. 10. so as to increase the SNR, since multiple amplifiers are needed, the cost is relatively increased. As shown in FIG. 12, even when the circuit (3-way multiplexer) is formed with lowest cost, the NSR is still lower 50% as compared to the Wheatstone bridge.

5-3) The conventional art 1 is sensitive to the offset value and the external error factor (temperature, magnetic force change). In case that three sensors are used, the conventional art 1 does not disclose a method for improving the error.

5-4) The construction cost of the conventional art 1 is relatively high. It may be changed depending on the purpose of the circuit and construction, six fixed resistors are totally needed in the interior of the sensor.

5-5) FIG. 9 shows a method for amplifying two output values from three sensors two times. In this case, the cost is relatively increased, and noises occur in the course of the amplification. The SNR becomes better two times as compared to when one sensor is used.

5-6) FIG. 10 shows a procedure that two output values from three sensors are selectively amplified using a 6-way multiplexer. In this case, the SNR has the same problems as when one sensor is adapted.

5-7) FIG. 11 shows a method for selectively amplifying via the multiplexor using one output value from three sensors. In this case, the SNR has the same problems as when one sensor is adapted.

The present invention, which will be described later, is basically designed to overcome the above problems of the conventional art 1 by dividing a circular magnet into NS poles and SN poles, and the sensor is disposed near the same, and sensor senses the rotation displacement of the circular magnet and outputs the same.

In conclusion, the conventional art 1 has a high GMR hysterisis, and the SNR is low owing to the structure of the sensor, and the measuring error owing to the external factors is high in the course of measurement. It is impossible to implement a 360° rotation recognition with only one sensor. When multiple sensors are used, the cost for increased parts becomes high, so that the total cost increases.

The conventional art 2 of the Korean patent application number 10-2004-0086196 (electronic type Bourdon tube pressure gauge) will be described.

The conventional part 2 is basically implemented by a sensing method using four poles of a magnet, not two poles. So, multiple sensors are disposed at an outer side of the magnet for detecting at 360° with a structure for recognizing the magnetic forces formed outside the magnet. The number of sensors is in proportion to the number of magnet poles.

The problems of the conventional art 2 will be described.

Since the magnetic force is recognized outside the magnet, it is too sensitive to external magnetic force for thereby increasing the errors in the course of measurement. Since multiple sensors are separated and arranged, when each sensor is manufactured, the accuracy decreases owing to an error occurring by the lot and an inherent error of each sensor. When the sensors are installed at the substrate, the accuracy decreases owing to the SMT error.

In particular, since multiple sensors are used, the unit cost increased. When the sensors are integrated into one sensor, the size of the magnet is limited, and the cost of the sensors is too high. When each sensor is integrated into one chip, an economical price is possible, and manufacturing error is less, but the error corrections with respect to the temperature correction and magnetic force changes can not be performed in the conventional art 2. So, a high performance product can not be manufactured.

The electronic pressure converter of the conventional art 1 and the electronic type Broudon tube pressure gauge of the conventional art 2 have the following problems since they use one sensor in addition to the above-described problems.

Namely, when a high performance sensing apparatus is implemented, the conventional art 1 uses a certain sensor SMR, and a high hysteresis is obtained based on the characteristic of sensor, and two output values are computed using the fixed resistors in the structure of the sensor, so that lower NRB is obtained, and 360° rotation angle is measured using sine and cosine values using one sensor. In addition, when setting an offset value, a method is not disclosed for correcting the errors with respect to the change of magnetic force and external temperature.

When multiple sensors are adapted, the detailed installation positions are not disclosed. When three sensors are used for 360° recognition using the above sensor, the parts except for the sensor increase, namely, the amplifiers or multiplexers increase. So, the unit cost becomes high.

In the case of the conventional art 2, it does not disclose methods for protecting an external magnetic force and overcoming the position error occurring when a multiple sensor are installed and the inherent errors (lot error, each product-based error) of each sensor and methods for offsetting the errors owing to the temperature difference of each sensor. When multiple sensors are integrated into one circuit, the size of the sensors may increase, so that the size of the magnet is limited. Since multiple sensors are installed, the number of parts increases. Since four poles are adapted, at least four sensors are used, so that the needed numbers of AMP and MUX is proportionally increased.

DISCLOSURE OF INVENTION

Technical Problem

Accordingly, it is an object of the present invention to provide a sensing apparatus of a Bourdon pressure gauge which overcomes the above-described problems and is able to implement a high accuracy and low price Bourdon pressure gauge using an AMR sensor or a hall sensor.

Technical Solution

To achieve the above objects, in a Broudon pressure gauge which includes a Broudon tube which is provided in a body and expands by a pressure, a spiral or helical displacement gear which is connected with one end of the Broudon tube for converting a displacement degree into a circular movement, a shaft which is provided in the body and is connected with the displacement gear and rotates, and a LCD which senses a rotation value of the shaft and displays the senses value, there is provided a sensing apparatus of a Broudon pressure gauge which comprises a magnet which has a N pole and a S pole at one end between both ends of the shaft which is connected with the displacement gear and rotates; a sensing unit which is provided in the body at a portion corresponding to the magnet and is disposed on at least three portions in circular directions and includes an AMR sensor or hall sensor for sensing the rotation value of the magnet; and a display control unit which receives a sine signal value and a cosine signal value among phase signal values from the sensors of the sensing unit and corrects the phase values and outputs to the LCD.

Advantageous Effects

In the present invention, the sensing apparatus of a Broudon pressure gauge according to the present invention is able to implement a high accuracy and low price Broudon pressure gauge using an AMR sensor or hall sensor.

BRIEF DESCRIPTION OF THE DRAWINGS

FIGS. 1 through 3 are cross sectional views illustrating a construction of a conventional Bourdon tube.

FIG. 4 is a block diagram illustrating a construction that a GMR sensor is arranged in a conventional electronic type pressure gauge.

FIG. 5 is a block diagram illustrating a sensing direction of a variable resistor of FIG. 4.

FIG. 6 is a graph of an output value based on a rotation angle of FIG. 5.

FIG. 7 is a block diagram illustrating a sensing direction of a variable resistor when a resistor unit is formed of one sensor of FIG. 4.

FIG. 8 is a graph of an output value based on a rotation angle of FIG. 7.

FIG. 9 is a block diagram illustrating an example that two output values from three sensors are amplified twice and used in a conventional art.

FIG. 10 is a block diagram illustrating an example that two output values from three sensors are amplified using a 6-way multiplexor in a conventional art.

FIG. 11 is a block diagram illustrating an example that one output value from three sensors is amplified using a multiplexer in a conventional art.

FIG. 12 is a block diagram illustrating an example that one output value from three sensors is amplified using a multiplexer in a conventional art.

FIGS. 13 through 20 are front and side views of a sensing apparatus of a Bourdon pressure gauge according to an embodiment of the present invention.

FIG. 21 is a cross sectional view illustrating a construction that a circular magnet and three sensors are provided in FIGS. 13 through 20.

FIG. 22 is a cross sectional view illustrating a construction that a circular magnet and four sensors are provided in FIGS. 13 through 20.

FIG. 23 is a cross sectional view illustrating a construction that three sensors are provided outside a circular magnet in FIGS. 13 through 20.

FIG. 24 is a cross sectional view illustrating a construction that a bar magnet and a sensor are provided in FIGS. 13 through 20.

FIG. 25 is a cross sectional view illustrating a construction of a Wheatstone bridge 1 which forms a chip in a magnet of FIGS. 21 through 24.

FIG. 26 is a cross sectional view illustrating a construction of a Wheatstone bridge 2 which forms a chip in a magnet of FIGS. 21 through 24.

FIG. 27 is a graph of an output value based on a rotation angle of FIGS. 25 and 26.

FIG. 28 is a graph of an output value based on a rotational angle of three voltages of FIGS. 25 and 26.

FIG. 29 is a view for describing an example of a measurement of 360° according to the present invention.

FIG. 30 is a view for describing an example of a measurement when four sensor are adapted in FIG. 22.

FIG. 31 is a block diagram illustrating a construction of a magnet connected with a magnetizing coil and a sensor of FIGS. 13 through 20.

FIGS. 32 and 33 is a data and reference view for describing an error owing to a distance between a sensor and a magnet and a deviation of a center point of FIGS. 13 through 20.

FIG. 34 is a cross sectional view illustrating a construction of a magnet connected with a shaft of FIGS. 13 through 20.

FIGS. 35 through 40 and 41 through 43 are cross sectional views illustrating various engagement states of a magnet, a sensor and a shaft of FIG. 34.

FIG. 44 is a block diagram of a PCB and a peripheral block of FIGS. 13 through 20.

BEST MODE FOR CARRYING OUT THE INVENTION

In a Broudon pressure gauge which includes a Broudon tube which is provided in a body and expands by a pressure, a spiral or helical displacement gear which is connected with one end of the Broudon tube for converting a displacement degree into a circular movement, a shaft which is provided in the body and is connected with the displacement gear and rotates, and a LCD which senses a rotation value of the shaft and displays the senses value, there is provided a sensing apparatus of a Broudon pressure gauge which composes a magnet which has a N pole and a S pole at one end between both ends of the shaft which is connected with the displacement gear and rotates; a sensing unit which is provided in the body at a portion corresponding to the magnet and is disposed on at least three portions in circular directions and includes an AMR sensor or hall sensor for sensing the rotation value of the magnet; and a display control unit which receives a sine signal value and a cosine signal value among phase signal values from the sensors of the sensing unit and corrects the phase values and outputs to the LCD.

Mode for the Invention

FIGS. 13 through 20 are front and side views of a sensing apparatus of a Bourdon pressure gauge according to an embodiment of the present invention.

In a Broudon pressure gauge which includes a Broudon tube 170 which is provided in a body and expands by a pressure, a spiral or helical displacement gear 150 which is connected with one end of the Broudon tube 170 for converting a displacement degree into a circular movement, a shaft which is provided in the body and is connected with the displacement gear and rotates, and a LCD 120 which senses a rotation value of the shaft and displays the senses value, there is provided a sensing apparatus of a Broudon pressure gauge which comprises a magnet 200 which has a N pole and a S pole at one end between both ends of the shaft which is connected with the displacement gear 150 and rotates; a sensing unit which is provided in the body at a portion corresponding to the magnet 200 and is disposed on at least three portions in circular directions and includes an AMR sensor or hall sensor 300 for sensing the rotation value of the magnet; and a display control unit 410 which receives a sine signal value and a cosine signal value among phase signal values from the sensors of the sensing unit and corrects the phase values and outputs to the LCD 120.

As shown in FIG. 14, the sensing unit of the Broudon pressure gauge comprises a magnet 200 which is provided at both ends of the shaft 140 and rotates at 0° to 360°, and a sensor 300 for sensing the rotation of the magnet 200.

As shown in FIG. 19, the sensing unit of the Broudon pressure gauge is formed in such a manner that a pin of the shaft 410 passes through the magnet 200 and the PCB 400 via the sensor 300, and the sensor 300 is provided at multiple portions of the PCB 400, and the pin of the shaft 140 passes through the weight center of the sensor 300 or a hole is formed at the center of the sensor 300, so that the pin passes through the hole.

FIG. 21 is a cross sectional view illustrating a construction that a circular magnet and three sensors are provided in FIGS. 13 through 20. FIG. 22 is a cross sectional view illustrating a construction that a circular magnet and four sensors are provided in FIGS. 13 through 20. FIG. 23 is a cross sectional view illustrating a construction that three sensors are provided outside a circular magnet in FIGS. 13 through 20. FIG. 24 is a cross sectional view illustrating a construction that a bar magnet and a sensor are provided in FIGS. 13 through 20.

The magnet 200 is formed of a circular magnet 210.

The circular magnet 210 is a hollow circular magnet.

The magnet 200 is formed of Sm2Co17.

In the circular magnet 210, three sensors A1, A2 and A3 are provided in the interior of the same, and the three sensors A1, A2 and A3 each have a measuring range of 120°.

In the circular magnet 210, four sensors X1, X2, Y1, Y2 are provided in the interior of the same, and the four sensors X1, X2, Y1, Y2 each have a measuring range of 90°.

In the circular magnet 210, three sensors B1, B2, B3 are provided at an outer side of the same, and the outer three sensors B1, B2, B3 each have a measuring range of 120°.

The magnet 200 is formed of a bar magnet 220.

In the magnet 200 and sensor 300, the sensor 300 is formed in ASIC (Applicable specific integrated circuit), and the ASIC sensor is module-formed (230) with the magnet.

FIG. 25 is a cross sectional view illustrating a construction of a Wheatstone bridge 1 which forms a chip in a magnet of FIGS. 21 through 24. FIG. 26 is a cross sectional view illustrating a construction of a Wheatstone bridge 2 which forms a chip in a magnet of FIGS. 21 through 24. FIG. 27 is a graph of an output value based on a rotation angle of FIGS. 25 and 26. FIG. 28 is a graph of an output value based on a rotational angle of three voltages of FIGS. 25 and 26. FIG. 29 is a view for describing an example of a measurement of 360° according to the present invention. FIG. 30 is a view for describing an example of a measurement when four sensor are adapted in FIG. 22. FIG. 31 is a block diagram illustrating a construction of a magnet connected with a magnetizing coil and a sensor of FIGS. 13 through 20.

The chip 230 is formed of a Wheatstone bridge having a plurality of variable resistors 231 through 234.

The Wheatstone bridges are provided in multiple numbers, with one bridge of the Wheatstone bridge being slanted at a certain angle (for example 45°) with the other one, with one Wheatstone bridge detecting a sine signal value, with the other Wheatstone bridge detecting a cosine signal value.

The sensor 300 comprises a "+" magnetizing coil which receives a current and detects the max value of the sensor 300 and transmits to the Wheatstone bridge; and a "−" magnetizing coil which receives a current and detects the min value of the sensor 300 and transmits to the Wheatstone bridge.

The sensor 300 is provided at upper, lower, left and right sides, respectively, about the rotation center of the magnet, with the upper and lower sensor outputting sine values, with the left and right sensors outputting cosine values.

The sensor 300 comprises a temperature correction unit for correcting an error of the temperature when the error of the temperature occurs owing to the position of the sensor.

FIGS. 35 through 40 and 41 through 43 are cross sectional views illustrating various engagement states of a magnet, a sensor and a shaft of FIG. 34.

As shown therein, the magnet 200 and sensor 300 are inserted into the holes 141 formed at the shaft 140 for thereby being parallel with the shaft 140 connected with the displacement gear 150.

FIG. 44 is a block diagram of a PCB and a peripheral block of FIGS. 13 through 20.

The display control unit 410 comprises a multiplexer 411 which receives a sine signal value and a cosine signal value from the sensors 300 and multiplexes the signal values; an amplifier 412 which amplifies the signals multiplexed by the multiplexer; and a CPU (control process unit) 413 which receives the signal amplified by the amplifier, corrects a phase value and outputs the corrected signal value to a LCD 120.

The multiplexer 411 is formed of a 3-way multiplexer.

The CPU 413 receives a signal amplified by the amplifier 412 and performs a temperature correction, magnetic force correction, and hysterisis correction based on the set offset value.

The CPU 413 processes the sine signal value and cosine signal value based on the cordic algorithm and controls a display of the rotation value.

The operations and effects of the sensing apparatus of a Bourdon pressure gauge according to the present invention will be described with reference to the accompanying drawings.

The present invention is designed to implement a high accuracy and low price Bourdon pressure gauge using an AMR sensor or hall sensor.

The present invention is designed to develop a high performance sensing apparatus using an AMR sensor and hall sensor and to develop a low price product. In case that an AMR sensor is used, a Wheatstone bridge is adapted in the interior of the sensor, and a circular magnet is divided into two N and S poles, and the sensors are arranged symmetrically about the magnet, and a magnetizing coil is provided.

The features of the present invention will be described as follows.

a) 360° sensing is implemented using three Wheatstone bridges.

b) The temperature correction, magnetic force correction and hysterisis corrections are performed with an offset value using a magnetizing coil.

c) The output values of sensors are selectively amplified using multiplexers, so that the cost of electronic apparatus decreases.

d) 360 sensing is implemented using four sensors when using gall effect sensors are adapted.

e) The temperature correction, magnetic force correction and hysterisis correction are performed with an offset value by providing the integrated chip with ASIC, and large amplification can be possible, and the circuit construction simplified.

f) Engaging portions are optimized so as to decrease a distance between a magnet and a sensor and a slant deviation.

g) A heating apparatus and thermometer are provided in the apparatus for correcting additional temperatures.

h) A correction program is provided so as to decrease mechanical hysterisis of Bourdon tube.

i) Cordic algorithm is computed using sine and cosine values from the sensors, and the rotation angles are indicated.

j) The pressure gauge of the present invention is adapted to a switch function, a data transmission function, and a control program for thereby diversifying the applicable range of products.

The present invention will be described in more detail with reference to FIGS. 13 through 44.

FIGS. 13 through 20 are front and side views of a sensing apparatus of a Bourdon pressure gauge according to an embodiment of the present invention. As shown therein, reference numerals 100 is a Broudon pressure gauge, 110 is a panel, 120 is a LCD, 130 is a pointer, 140 is a shaft, 150 is a displacement gear (movement assay), 160 is a body, 170 is a Broudon tube, 180 is a battery, and 190 is a bolt. In addition, 200 is a magnet, 300 is a sensor and 400 is a PCB.

FIG. 14 shows an example that a magnet 200 and a sensor 300 are installed at both ends of the shaft 140. 360° sensing is possible at the front end, and 360° sensing is possible at the rear end as well. Each sensor 300 may be differently adapted. In case that the sensor 300 being able to sense 180° is adapted, it is designed to operate at both sides for thereby sensing at 360°.

FIG. 15 shows an example that the sensor 300 is positioned opposite to the PCB 400. It may be selected depending on the size and intensity of the magnet 200. Oil may be preferably filled in the Broudon tube 170.

FIG. 16 shows a common and more stable construction.

FIG. 17 shows a construction that the analog pointer 130 is engaged at the magnet 200, and the sensor 300 is engaged at an analog glass window. In this case, it is possible to indicate in analog and digital types.

FIG. 18,19,20 shows a method for concurrently indicate the analog and digital types. A pin of the shaft 140 passes through the magnet 200 and passes through the PCB 400 via the sensor 300. Since the sensors 300 are distributed and arranged on the PCB, the pin of the shaft 140 passes through the weight center of each sensor 300, and a hole is formed at the center of the integrated sensor 300.

FIGS. 21 through 40 are cross sectional views of the magnet and sensor.

The N and S pole magnet has stable magnetic force distributions of the magnets when the circular magnet 210 or the hollow circular magnet is used as compared to the bar magnet. In case of the hollow magnet, less external magnetic force is affected.

FIG. 21 shows a construction that three sensors 300 of A1, A2 and A3 are integrated in one chip 230. FIG. 13 shows a construction that four sensors 300 of X1, X2, Y1 and Y2 are integrated into one chip 230.

As shown in FIG. 21, one sensor 300 senses at 120°, and the sensors A1 and A2 sense at 90° to 120°, and the sensors A2 and S3 sense at 120° to 240°, and the sensors A3 and A1 sense at 240° to 360°.

As shown in FIG. 22, the sensors X1, X2, Y1 and Y2 divide into four sections for thereby sensing at 90°.

As shown in FIGS. 21 and 22, the sensor 300 and the magnet 200 are commonly positioned in the interior and are symmetrically disposed. It is formed of the N and S poles.

As shown in FIG. 22, the sensor 300 is positioned at an outer side of the magnet 200. Here, the magnet 200 has at least two poles for thereby sensing at 360°. When the pole is divided into at least two poles, the linearity of the internal magnetic force decreases in proportion to the increase of the number of poles. It has a lower linearity as compared to the bar magnet. Since the inner magnetic force is not used, the inner magnetic force is not considered. Since the external magnetic force of the magnet is used, it is sensitive to the external factor of the pressure gauge, it is needed to set up a certain prevention with respect to the external magnetic force.

FIG. 23 shows a sensing method using the bar magnet 220. Here, the linearity of the interior of the magnet decreases as compared to the circular magnet 210. A rotation force deviation occurs in the course of the rotation. In the case of a rectangular shape, the hysterisis value increases based on the magnet when it moves up and down owing to the gravity.

The circular magnet 210 has 1) more stable internal magnetic force, and 2) can decrease hysteresis owing to a magnet as compared to the bar magnet 220. The sensing ability of the magnet is in proportion to the size of the magnet, but since load is applied to the shaft of the rotation body, errors may occur. As a result of the actual measurement, when the circular magnet 210 is formed in NdFeB type and has a diameter of 6.0 mm and a thickness of 2.5 mm, it is possible to obtain an excellent performance with the sensor using the hall effect.

At this time, the magnet is preferably made of Sm2Co17 in consideration with the size, shape and price of the magnet, and the type N48 of the magnet has more strong magnetic force. In case that the distance between the magnet and the sensor is short, the magnet having relatively weaker magnetic force such as Sprox 11/22p, HF22/15, Neofer 55/100p may be used. It is important that the permanent magnet has a stability.

The Sm2Co17 magnet is formed of sintered samarium (Sm) and cobalt (Co). It is very excellent to a temperature based stability and anti-corrosion property. The SmCo magnet is classified into Sm1Co5 and Sm2Co7. The Sm2Co17 has a very high iHc value and is more stable than Sm1Co5.

The NdFeB magnet may be used. The NdFeB magnet is made in such a manner that powders of finely ground NdFeB alloy is compressed under electromagnetic field and is processed via sintering, heat treatment, process and grumagnet procedure. The NdFeb magnet has anisotropic property, and the orientation of the same is determined in the course of compression process. the NdFeB magnet is easily oxidized in air, so that it is needed to process the surface. As a surface process method, Au, Zinc, Nickel coating method is performed. Multiple coating may be performed with Nickel+Copper+Nickel.

FIG. 25 is a cross sectional view illustrating a construction of a Wheatstone bridge 1 which forms a chip in a magnet of FIGS. 21 through 24. FIG. 26 is a cross sectional view illustrating a construction of a Wheatstone bridge 2 which forms a chip in a magnet of FIGS. 21 through 24.

As shown in FIG. 21, according to the AMR sensor, three sensors are integrated into one chip, and one sensor is designed to sense at 120°. The magnetization coil is installed for setting an offset value. As shown in FIGS. 25 and 26, each integrated sensor 300 is formed of four variable resistors 231-234 which form a Wheatstone bridge.

According to the hall sensor, four sensors are integrated into one chip 230, and the rotation angles are obtained using sine 0 and cosine 0 in two sensors based on the pole characteristic of the hall sensor. The output values are amplified using the ASIC (Application specific integrated circuit). A certain apparatus may be provided for enhancing a temperature correction, hysterisis correction, accuracy correction, etc.

The above features will be described in detail.

The AMR sensor has four variable resistance units in the Wheatstone bridge, and the output value is obtained from the max output value V1+ and the min output value V1−. The SNR is higher than the conventional art 1 by two times.

So as to obtain the output value of FIG. 16, the following formula 1 is used.

$$V_{a,Cos}(\alpha) = \frac{V_0}{2} E \frac{\Delta R}{R} E \text{Cos}(2E\alpha) \qquad \text{[Formula 1]}$$

As shown in FIG. 26, when the output value is obtained by rotating the Wheatstone bridge at 45°, the following formula 2 is obtained.

$$V_{a,Sin}(\alpha) = \frac{V_0}{2} E \frac{\Delta R}{R} E \text{Sin}(2E\alpha) \qquad \text{[Formula 2]}$$

FIG. 27 is a graph of the output value based on the rotation angles of FIGS. 25 and 26. FIG. 27 shows the output values based on the formulas 1 and 2.

So as to measure the rotation angle of 180° using the formulas 1 and 2, the formula is redefined using the sine and cosine values for thereby defining the following formula 3.

$$\frac{V_{a,Sin}}{V_{a,Cos}} = \frac{\frac{V_0}{2} E \frac{\Delta R}{R} E \text{Sin}(2E\alpha)}{\frac{V_0}{2} E \frac{\Delta R}{R} E \text{Cos}(2E\alpha)} \qquad \text{[Formula 3]}$$
$$= \frac{\text{Sin}(2E\alpha)}{\text{Cos}(2E\alpha)}$$
$$= \text{Tan}(2E\alpha)$$

The above formula 3 is redefined, thus obtaining the following formula 4.

$$\alpha = \frac{1}{2}\text{arcTan}(Y) \qquad \text{[Formula 4]}$$

where Y is $$Y = \frac{V_{a,Sin}}{V_{a,Cos}}$$

Three different amplification ratios are obtained from three values using three Wheatstone bridges so as to sense at 360°, and then the rotation degree is obtained based on the cordic algorithm, and the following formula s is defined.

$$\alpha_{n,m} = \frac{1}{2}\text{arcTan}\left(-\frac{1+Y_{nm}}{\sqrt{3}}\right) \qquad \text{[Formula 5]}$$

$Y_{nm}$ may be redefined as the following formula 6.

$$Y_{nm} = \frac{V_{a,2}}{V_{a,1}};\ \frac{V_{a,3}}{V_{a,2}}\ \text{or}\ \frac{V_{a,1}}{V_{a,3}} \qquad \text{[Formula 6]}$$

The average rotation degree α may be defined as the following formula 7.

$$\alpha = \frac{(\alpha_{21} + \alpha_{32} + \alpha_{13})}{3} \qquad \text{[Formula 7]}$$

The value α has a certain error with respect to the actual angle $\alpha_0$ owing to the offset value $\psi_o$ and the rotation error Δα.

It may be defined as the following formula 8.

$$\alpha = \alpha_0 + \psi_0 + \Delta\alpha \qquad \text{[Formula 8]}$$

FIG. 28 is a graph of an output value based on a rotational angle of three voltages of FIGS. 25 and 26. FIG. 20 is a view for describing an example of a measurement of 360° according to the present invention.

In the above formulas, the 360° angle is measured using the Wheatstone bridge. As shown in FIG. 20, the changes of the temperature and magnetic force and the errors of the output values are corrected using the magnetizing coil, and a more accurate 360° measuring method may be defined as follows. Here, each reference character may be defined as follows.

$U_{B,n}$ : current is inputted into sensor $Ua_n(I_{coil}+)$ : output value from $I_{coil}+$ $Ua_n(I_{coil}-)$ : output value (bridge n=1, 2, 3) from $I_{coil}-$ When the average output value is obtained from the Wheatstone bridge n=1, 2, 3, the following formula 9 may be defined.

$$U_{a_n} = \frac{U_{a_n}(I_{coil}+) + U_{a_n}(I_{coil}-)}{2} \qquad \text{[Formula 9]}$$

where $Ua_n$ (n=1, 2, 3) is an accurate offset value.

In addition, when the actual rotation degree $W_{n,m}$ is obtained from two pairs of output values (n,m=1, 2, 3; n≠m), the following formula 10 is obtained.

$$W_{n,m} = \frac{1}{2}\text{arctan}\left(-\frac{1+2Y_{n,m}}{\sqrt{3}}\right) \qquad \text{[Formula 10]}$$

where the amplification ratio $Y_{n,m}$ is $$= \frac{U_{a_2}}{U_{a_1}};\ \frac{U_{a_3}}{U_{a_2}};\ \text{or}\ \frac{U_{a_1}}{U_{a_3}}.$$

When the output value difference $\Delta U_n$ from all the bridges n are obtained, the following formula 11 is defined.

$$\Delta U\alpha_n = Ua_n(I_{coil}+) - Ua_n(I_{coil}-) \qquad \text{[Formula 11]}$$

where three $W_{n,m}$ values are obtained in average values. The formula, which uses the value of $W_{n,m}$, is adapted for a low hysterisis range of exponent used for obtaining a very accurate rotation degree.

The approximate value of W may be simply obtained based on a single and polynominal formula with three output values $Ua_n$ (n=1, 2, 3). Namely, it is possible to compute the values based on a combination (W, AU) of the above variables for 360° rotation.

FIG. 30 is a view for describing an example when it is formed with four sensors of FIG. 22.

In case that a hall sensor in which four sensors are integrated as shown in FIG. 30, the sine value is obtained with different Y1-Y2 values based on the magnetic force, and the cosine value is obtained with different X1-X2 values, so that the rotation value α may be obtained with the following formula 12 using the cordic algorithm from the sensor outputs.

$$\alpha = \text{arcTan}\frac{(Y1-Y2)}{(X1-X2)}q_\rho \qquad \text{[Formula 12]}$$

where ρ is an error constant with respect to the rotation angle.

Here, the cordic (Coordinate Rotation Digital Computer) algorithm is a repeating algorithm which includes a pair-curve function or a sine and cosine, a size and arc tangent for computing a trigonometrical function. The tangent values are obtained by means of a binary digit shift computation, not by multiplication. The above method is used for computing an accurate rotation value. The above cordic algorithm is disclosed in J. E. Volder "The cordic trigonometric computing technique" in IRI transaction on electronic computers, EC-8, 1959, pages 330-334.

FIG. 31 is a block diagram illustrating a construction of the sensor connected with the magnetizing coil of FIGS. 13 through 20.

One max value and min value are obtained in the four resistance unit structure of the Wheatstone bridge. The above structure is able to compute the optimum output V1. Namely, the SNR is optimized.

So as to reliably sense at 360°, it is needed to set the offset value in consideration with the external variables (magnetic force weakness of permanent magnet owing to the pass of time, change of output value based on an external temperature change, and hysterisis). So, the output values are optimized by correcting the external variables using the magnetizing coil for each measurement.

So as to reliably sense at 360°, at least three sensors are arranged at regular intervals of 120° and are integrated into one chip. The magnetizing coil is installed on the three sensors. The magnetizing coil is additionally engaged at the sensors.

When three sensors are integrated, three output values are outputted all the time. Three values include sine and cosine values. Since three values are outputted at a specific angle, the ratios of the output values are computed and used.

When four sensors are adapted, four output values are obtained. However, two sensors are used. Each sensor value is selectively used based on the sections (44 sections). The sensor recognizes the pole (hall effect) at over 180°. The above sensor has too small output value, so that the ASIC is needed. In the course of ASIC, the output values am corrected and amplified.

So as to sense at 360°, at least three sensors are needed. So, an accurate rotation degree can be computed via the cordic algorithm using the output values of the sensors. According to the cordic algorithm, the sine and cosine values are outputted and used.

The temperature correction of the sensor is performed for an accurate rotation angle recognition. Since the output values of the sensors change in accordance with the temperature changes of the air, it is needed to correct the output values for dealing with the temperature changes. For the above purpose, the magnetizing coil is used. As shown in FIGS. 16 and 22, four resistance units cause temperature changes for thereby generating errors. The above errors are used to generate a 0.50 rotation angle recognition error at the temperature difference of 125° C. So as to overcome the above problem, a constant temperature apparatus is installed in the interior of the product. Namely, a certain heating apparatus is preferably used. When the temperature difference is maintained within a scope of 10° C., since the 0.05° rotation angle recognition error occurs, it is possible to manufacture a high performance product. In this case, more power consumption is inevitable. So as to overcome the above problems, an external power is preferably used. The pressure gauge is formed of a standard pressure gauge.

A displacement error may occur in the Broudon tube based on an external temperature. It may change based on the material of the Broudon tube. Since a temperature sensor is installed in the interior of the product, it is possible to correct the error with respect to the temperature change of the Broudon tube. The displacement value of the Broudon tube is obtained and stored based on the temperature change. The correction of the error has a bigger effect as compared to the correction of the temperature change error using the resistance units.

With the uses of the beating apparatus and the thermometer, it is possible to decrease the errors of the Broudon pressure gauge and the sensors.

The magnetic forces may slightly change based on the kinds of sensors. The optimum magnetic force is preferred for decreasing the errors of the output values. The Wheatstone bridge is preferably formed of 1.0 mT or over 24 mT. The sensor using the hall effect is formed of average 75 mT. Since the stable magnetic force changes depending the pass of time, it is needed to frequently change the offset value based on the change of magnetic force. The magnetic force has large effect in case of shorter distance. Less distortion is preferred.

FIGS. 32 and 33 is a data and reference view for describing the errors based on a distance between the sensor and magnet and a distance of the center point of FIGS. 13 through 20.

As shown in FIG. 32, the axes X and Y move from the center point, and the distance of the axis Z is the distance between the magnet and the sensor, and the slant means a distortion. The rotation unit of the common Broudon pressure gauge has a diameter of 1 mm to 3 mm. The magnet of a diameter of about 10 mm is aligned with the center and is attached on the cross section of the same in a vertical direction. At this time, errors occur.

So as to decrease the above errors, it is needed to construct as shown in FIG. 34.

FIG. 34 is a cross sectional view illustrating a construction of a magnet connected with a shaft of FIGS. 13 through 20. FIGS. 35 through 40 and 41 through 43 are cross sectional views illustrating various engagement states of a magnet, a sensor and a shaft of FIG. 34.

FIG. 35 shows a shaft 140, and FIG. 36 shows an engagement of the magnet hole 201, the sensor 300 and the shaft 140 for engaging the shaft hole 141 at the circular magnet 210 according to the present invention. FIGS. 37 through 40 show the constructions of a magnet support 142 for engaging the circular magnet 210 to the shaft 140, a shaft center hole 143 for supporting the center point of the magnet, a magnet protection member 144 for supporting an outer side of the magnet and protecting the magnetic force, an engaging member 145 for engaging the magnet, and a bolt 191 for fixing the magnet to the engaging member 145 or the shaft hole 141. Namely, there are shown various examples for engaging the magnet 200 and the pointer 130 and engaging at the shaft.

So as to implement the above operations, the works are performed as follows.

a) a through hole is formed at the center of a circular magnet. If necessary, a certain step is formed at the through hole. The through hole is vertical or diagonal with respect to the magnet surface.

b) A shaft of at least one step is formed at the magnet engaging member of the rotation unit and is engaged with the magnet. At least two steps are formed on the plane surface of the engaging unit or at least one pin is made and engaged. So as to further support the above structure, the support member is installed and engaged.

c) When a magnet is attached to the rotation unit having a small diameter, it is easy to maintain a certain distance (each step determines an assembling depth). The engagement of the hole of the magnet and the rotary shaft minimizes the distortion in the axis Z (slant). In the course of assembling, an adhesive is used for thereby achieving a stable construction.

d) A step may be formed at an outer diameter of the magnet and is engaged with the rotation unit. A hole is formed at the center and is engaged with the magnet. A magnet engaging member is additionally made, and the magnet is engaged in the above manner and is engaged to the rotation unit.

e) When a hollow circular magnet is used, the same procedure is adapted. The hollow circular magnet has a function of preventing errors by blocking an external magnetic force.

The size of the magnet and the intensity of the magnetic force are in relation with the sensitivity and level of the sensor. When the size of the magnet increases, load is applied to the rotation shaft, and the hysteresis increases. In this case, it is needed to lubricate the friction portions for thereby decreasing a friction coefficient. So, it is flooded in oil or is coated with tefron.

f) The shaft is made of a magnetic material. So, the magnet unit and the shaft are integrated.

FIG. 44 is a block diagram illustrating a PCB and peripheral blocks of FIGS. 13 through 20.

The correction of the hysterisis of the Broudon tube 170 is performed as follows in the PCB 400.

The Broudon tube 170 originally has hysterisis owing to its structure. The displacement degree may have a certain change owing to the change of an external temperature. The change of the displacement of the Broudon tube 170 was described in the above. The structural hysterisis is divided into max resolution when the pressure increases. The above values are used for correcting the errors as compared to the standard pressure gauge. An erroneous correction may be performed for durability. When the hysterisis is specified after 30 thousand times, −3 is not applied when the error is +3 when determining the initial correction value, namely, −4 is applied. So, the initial value is outputted with the value of −1. After the use of 30 thousand times, the value of 1 is added, and then the correction is performed. When the pressure drops, the same method is performed.

The standard pressure gauge and the Broudon digital pressure gauge are installed at the same line, and pressure are applied, and the output values are compared on the computer. As a result of the comparison, it is possible to check the mechanical hysterisis of the Broudon tube, so that basic materials are obtained for developing a correction program. It may be used for checking the durability. For example, the output values may be obtained by the unit of 100 times and may be compared. So, it is possible to check the errors owing to the number of uses. A multiplexing correction program may be obtained. It may be set so that a second correction program automatically works after a certain time period of use by computing the number of uses.

The PCB 400 receives and amplifies the output values of the sensor 300. It is possible to selectively amplify using three amplifier with respect to three sensors 300 or using one multiplexer 411. When it is constituted based on the ASIC, the above elements may be all integrated into the chip.

In addition, the magnet 200 and the sensor 300 are arranged based on the setting of the center point. When three sensors are integrated into one chip or four sensors are integrated into one chip, three sensors are symmetrically aligned about the center at angles of 120°, and four sensors are aligned symmetrically about the center at angles of 90°. In the above alignments, the center of the magnet is positioned at the weight center of each sensor. The center point of the magnet is aligned with the weight center of a triangle or rectangular shape. When the weight center deviates, errors occur.

In the present invention, it is possible to implement a high accuracy and low price Broudon pressure gauge using an AMR sensor or hall sensor.

INDUSTRIAL APPLICABILITY

As described above, the sensing apparatus of a Broudon pressure gauge according to the present invention is able to implement a high accuracy and low price Broudon pressure gauge using an AMR sensor or hall sensor.

The effects of the present invention will be described in more detailed as follows.

First, with a feature of the AMR/hall sensor, a sensing apparatus having a high accuracy is developed. At least three sensors are integrated, and the sine and cosine values are obtained from each sensor, and it is possible to obtain the rotation values of 360° or more with the cordic algorithm.

Second, a sensing apparatus is developed by obtaining a higher SNR using the Wheatstone bridge of the AMR. As shown in FIG. 31, the output value V1 is obtained by subtracting the min resistance value from the max resistance value. So, it is possible to enhance the SNR by two times as compared to the conventional art 1.

Third, an offset value is obtained all the time using a magnetizing coil, so that it is possible to correct the errors of the output values owing to the changes of temperature and magnetic forces. In particular, the offset value is reset with respect to temperature and magnetic force for each measurement. It is possible to obtain the max value and min value all the time. When the offset value is set using the magnetizing coil, the offset value is set with the latest value with respect to the temperature deviation based on the change of an external temperature. The offset value is set with the latest value all the time with respect to the changes of magnetic force by the pass of time and external influence.

Fourth, in the present invention, it is possible to develop an excellent sensing apparatus by stabilizing the distance between the magnet and the sensor by forming at least one step at the magnet engaging part of the mechanical unit, minimizing the slant between the sensor and the magnet and thus decreasing the errors. As shown in FIG. 32, there is shown a data for describing the errors owing to the distance between the sensor and the magnet and the deviation of the center point. As shown therein, the slant of the axis z is very important. Namely, since the change of the magnetic force allows the occurrence of errors during the measurement since the magnet is not parallel with respect to the sensor, the magnet should be installed at the driving unit for thereby obtaining a stable operation.

Fifth, a certain program is stored in the central processing unit for correcting the mechanical errors (hysterisis) of the Broudon tube, so that it is possible to develop a sensing apparatus having an excellent accuracy. For this, the resolution capacity of the sensor should be enhanced. When it recognizes 0.05°, it is needed to correct the errors as compared to the standard pressure gauge having 7200 steps in the clockwise direction and 7200 steps in the counterclockwise direction. At this time, when it rotates in the clockwise direction and counterclockwise direction, the error occurs at the hysterisis of the mechanical part (Broudon tube), but the error occurs at the sensor as well. So, it is needed to integrate the sensors, so that the hysterisis of the sensor is corrected during the ASIC process or it is corrected when implementing the algorithm.

Sixth, the max and min output values are received from the Wheatstone bridge and are amplified using the multiplexer, so that since the number of amplifiers decreases by two, the PCB is designed for thereby decreasing the cost. When four integrated sensors are used, the 4-way multiplexer is used, and the sensors are integrated into one chip, and the ASIC process is performed. So, it is possible to further decrease the cost. The output values are excellent since MUX, AMP, Filter, CPU, etc. are integrated into the chip. The design of substrate is simple, and the cost can be decreased.

Seventh, a temperature correction apparatus is provided in the interior of the apparatus, so that it is possible to correct the errors of temperatures. The amplitudes of the variable resistance unit and the temperature coefficient of the Wheatstone bridge are similar. The sine value between the variable resistor and the current value is offset with the temperature effect when the rotation value is computed using a temperature coefficient value. The temperature coefficient value obtained from the offset value is a more important temperature effect factor. It occurs owing to a small temperature difference of the variable resistance units when four variable resistors operate. It is nearly impossible to offset the same. As a result of the actual measurement, the error of the rotation value at the temperature deviation (Δ125° C.) makes an error of about 0.5°. So as to correct the above error, a temperature correction apparatus is provided, so that temperature effects can be corrected.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. In a Bourdon pressure gauge which includes a Bourdon tube which is provided in a body and expands by a pressure, a spiral or helical displacement gear which is connected with one end of the Bourdon tube for converting a displacement degree into a circular movement, a shaft which is provided in the body and is connected with the displacement gear and rotates, and a LCD which senses a rotation value of the shaft and displays the senses value, a sensing apparatus of a Bourdon pressure gauge, comprising:
   a magnet which has a N pole and a S pole at one end between both ends of the shaft which is connected with the displacement gear and rotates;
   a sensing unit which is provided in the body at a portion corresponding to the magnet and is disposed on at least three portions in circular directions and includes an AMR sensor or hall sensor for sensing the rotation value of the magnet; and
   a display control unit which receives a sine signal value and a cosine signal value among phase signal values from the sensors of the sensing unit and corrects the phase values and outputs to the LCD.

2. The apparatus of claim 1, wherein said shaft rotates at 360°.

3. The apparatus of claim 1, wherein a pin of the shaft passes through the magnet and passes through a PCB, which forms the display control unit, via the sensor, and said sensors are disposed on the PCB at multiple portions, and the pin of the shaft passes through the weight center of the sensor or it passes through a hole formed at the center of the sensor integrated.

4. The apparatus of claim 1, wherein said magnet is formed of a circular magnet.

5. The apparatus of claim 4, wherein said circular magnet is a hollow circular magnet.

6. The apparatus of claim 4, wherein said magnet is formed of Sm2Co17.

7. The apparatus of claim 5, wherein in said circular magnet, three sensors are provided in the interior of the same, and said three sensors each have a measuring range of 120°.

8. The apparatus of claim 5, wherein in said circular magnet, four sensors are provided in the interior of the same, and said four sensors each have a measuring range of 90°.

9. The apparatus of claim 5, wherein in said circular magnet, three sensors are provided at an outer side of the same, and said outer three sensors each have a measuring range of 120°.

10. The apparatus of claim 1, wherein said magnet is formed of a bar magnet.

11. The apparatus of claim 1, wherein in said magnet and sensor, said sensor is formed in ASIC, and the ASIC sensor is module-formed with the magnet.

12. The apparatus of claim 11, wherein said chip is formed of a Wheatstone bridge having a plurality of variable resistors.

13. The apparatus of claim 12, wherein said Wheatstone bridges are provided in multiple numbers, with one bridge of the Wheatstone bridge being slanted at a certain angle with the other one, with one Wheatstone bridge detecting a sine signal value, with the other Wheatstone bridge detecting a cosine signal value.

14. The apparatus of claim 12, wherein said sensor comprises:
   a "+" magnetizing coil which receives a current and detects the max value of the sensor and transmits to the Wheatstone bridge; and
   a "–" magnetizing coil which receives a current and detects the min value of the sensor and transmits to the Wheatstone bridge.

15. The apparatus of claim 1, wherein said sensor is provided at upper, lower, left and right sides, respectively, about the rotation center of the magnet, with the upper and lower sensor outputting sine values, with the left and right sensors outputting cosine values.

16. The apparatus of claim 1, wherein said sensor comprises a temperature correction means for correcting an error of the temperature when the error of the temperature occurs owing to the position of the sensor.

17. The apparatus of claim 1, wherein said magnet and sensor are inserted into the holes formed at the shaft for thereby being parallel with the shaft connected with the displacement gear.

18. The apparatus of claim 1, wherein said display control unit comprises:
   a multiplexer which receives a sine signal value and a cosine signal value from the sensors and multiplexes the signal values;
   an amplifier which amplifies the signals multiplexed by the multiplexer; and
   a CPU which receives the signal amplified by the amplifier, corrects a phase value and outputs the corrected signal value to a LCD.

19. The apparatus of claim 18, wherein said multiplexer is formed of a 3-way multiplexer.

20. The apparatus of claim 18, wherein said CPU receives a signal amplified by the amplifier and performs a temperature correction, magnetic force correction, and hysterisis correction based on the set offset value.

21. The apparatus of claim 18, wherein said CPU processes the sine signal value and cosine signal value based on the cordic algorithm and controls a display of the rotation value.

* * * * *